US008941294B2

(12) United States Patent
Goebel et al.

(10) Patent No.: US 8,941,294 B2
(45) Date of Patent: Jan. 27, 2015

(54) LUMINOPHORE COMPOSITION FOR LOW PRESSURE DISCHARGE LAMPS

(75) Inventors: Nina Goebel, Gersthofen (DE); Claudia Held, Aindling (DE); Armin Konrad, Grossaitingen (DE)

(73) Assignee: Osram AG, Munich (DE)

( * ) Notice: Subject to any disclaimer, the term of this patent is extended or adjusted under 35 U.S.C. 154(b) by 0 days.

(21) Appl. No.: 13/504,973

(22) PCT Filed: Oct. 25, 2010

(86) PCT No.: PCT/EP2010/066040
§ 371 (c)(1),
(2), (4) Date: Apr. 30, 2012

(87) PCT Pub. No.: WO2011/054691
PCT Pub. Date: May 12, 2011

(65) Prior Publication Data
US 2012/0217866 A1 Aug. 30, 2012

(30) Foreign Application Priority Data
Nov. 9, 2009 (DE) .......................... 10 2009 052 468

(51) Int. Cl.
*H01J 1/62* (2006.01)
*C09K 11/77* (2006.01)
(Continued)

(52) U.S. Cl.
CPC .......... *C09K 11/7749* (2013.01); *C09K 11/665* (2013.01); *C09K 11/76* (2013.01); *C09K 11/7734* (2013.01); *C09K 11/774* (2013.01); *C09K 11/778* (2013.01); *H01J 61/44* (2013.01)
USPC ....................................................... 313/503

(58) Field of Classification Search
USPC .................................................. 313/500–512
See application file for complete search history.

(56) References Cited

U.S. PATENT DOCUMENTS

| 4,216,408 A | 8/1980 | Verstegen et al. |
| 4,406,971 A | 9/1983 | Takano et al. |

(Continued)

FOREIGN PATENT DOCUMENTS

| AT | 351635 B | 8/1979 |
| CN | 1202555 C | 5/2005 |

(Continued)

OTHER PUBLICATIONS

English abstract of JP 2005230171 A.
English abstract of DE 19722404 A1.
English abstract of CN 101074376 A of Nov. 21, 2007.
English abstract of CN 201004450 Y of Jan. 9, 2008.
Office Action issued in the corresponding Chinese application No. 201080050740.6, dated Jul. 14, 2014.

*Primary Examiner* — Anh Mai
*Assistant Examiner* — Brenitra M Lee

(57) ABSTRACT

In various embodiments, a luminophore composition for low pressure discharge lamps for generating radiation with a color temperature of greater than 4800 K having a very good general color rendering index of greater than 90, the luminophore composition including at least one halophosphate luminophore, a luminophore emitting in the red wavelength region, a luminophore emitting in the blue-green wavelength region, a europium-doped luminophore emitting in the blue wavelength region and a Tb-doped luminophore emitting in the green wavelength region, wherein the luminophore composition includes a luminophore emitting in an emission range in the visible region with wavelengths of greater than 380 nm and at least one emission band in the near ultraviolet and that the emitted intensity of the luminophore is smaller in the visible region than in the near ultraviolet region.

17 Claims, 2 Drawing Sheets

(51) Int. Cl.
*C09K 11/66* (2006.01)
*C09K 11/76* (2006.01)
*H01J 61/44* (2006.01)

(56) References Cited

U.S. PATENT DOCUMENTS

| | | |
|---|---|---|
| 6,489,716 B1 | 12/2002 | Tews et al. |
| 6,794,810 B2 | 9/2004 | Gruber et al. |
| 7,378,784 B1 | 5/2008 | Liu |
| 2003/0076028 A1 | 4/2003 | Nieda et al. |
| 2003/0076029 A1* | 4/2003 | Gruber et al. ............ 313/486 |
| 2007/0013314 A1 | 1/2007 | Derhaeg |
| 2008/0211378 A1 | 9/2008 | Dutta et al. |
| 2008/0297027 A1 | 12/2008 | Miller et al. |

FOREIGN PATENT DOCUMENTS

| | | |
|---|---|---|
| CN | 101074376 A | 11/2007 |
| CN | 201004450 Y | 1/2008 |
| DE | 19722404 A1 | 6/1998 |
| DE | 19806213 B4 | 12/2005 |
| EP | 1306885 B1 | 4/2008 |
| EP | 1676900 B1 | 2/2011 |
| JP | 2005230171 A | 9/2005 |
| WO | 2005074005 A2 | 8/2005 |

* cited by examiner

Fig. 2 - Tab. 1

| Group | u' | v' | delta u | x10 | y10 | D50_Set01 | D50_Set02 | D50_Set03 | D50_Set04 | D50_Set05 | M_VIS | D50_Set01 | D50_Set02 | D50_Set03 | M_UV |
|---|---|---|---|---|---|---|---|---|---|---|---|---|---|---|---|
| OLD | 0,2170 | 0,4886 | 0,0068 | 0,3562 | 0,3564 | 0,8043 | 0,5982 | 1,7310 | 0,3828 | 0,5204 | 0,8073 | 2,8052 | 3,3028 | 3,9263 | 3,3448 |
| NEW | 0,2117 | 0,4863 | 0,0030 | 0,3472 | 0,3544 | 0,3291 | 1,0295 | 0,9629 | 0,7513 | 0,5088 | 0,7163 | 1,0488 | 0,4959 | 1,3887 | 0,9778 |

| Group | R1 | R2 | R3 | R4 | R5 | R6 | R7 | R8 | R9 | R10 | R11 | R12 | R13 | R14 | Ra8 |
|---|---|---|---|---|---|---|---|---|---|---|---|---|---|---|---|
| OLD | 97,7 | 98,3 | 82,5 | 98,7 | 98,8 | 95,2 | 97,6 | 96,6 | 98,1 | 88,2 | 90,1 | 93,0 | 95,6 | 88,1 | 95,7 |
| NEW | 97,7 | 95,7 | 92,4 | 97,1 | 99,4 | 98,8 | 97,7 | 98,2 | 95,4 | 98,8 | 91,9 | 97,5 | 94,8 | 94,3 | 97,1 |

US 8,941,294 B2

LUMINOPHORE COMPOSITION FOR LOW PRESSURE DISCHARGE LAMPS

RELATED APPLICATIONS

The present application is a national stage entry according to 35 U.S.C. §371 of PCT application No. PCT/EP2010/066040 filed on Oct. 25, 2010, which claims priority from German Application No.: 10 2009 052 468.1, filed on Nov. 9, 2009.

TECHNICAL FIELD

Various embodiments relate to a luminophore composition for low pressure discharge lamps for generating radiation with a color temperature of greater than 4800 K having a good general coloring index and a low pressure discharge lamp using such a composition.

BACKGROUND

EP 1 306 885 B1 discloses a luminophore composition for a low pressure discharge lamp and a low pressure discharge lamp which shows a high luminous efficacy at a color temperature of greater than 5000 K and good color rendering. Due to the increasing demands placed on color matching in reprographics, an optimum result cannot be achieved in the near ultraviolet spectral region with this luminophore composition.

SUMMARY

Various embodiments provide a luminophore composition for low pressure discharge lamps and a low pressure discharge lamp having a luminophore composition of this type which is particularly suitable for color matching, particularly in compliance with ISO 3664:2009(E), The suitability of the color temperature and the color quality are determined and quantified by various standardized methods. At the same time, an increased luminous flux is to be achieved.

A luminophore composition of this type for low pressure discharge lamps and a low pressure discharge lamp provided with such a composition are used, for example, in color matching and may be put to use in the graphical and printing industries, the lacquer and paint industries and in museums.

Particularly advantageous embodiments are disclosed in the dependent claims.

A luminophore composition according to various embodiments includes at least one halophosphate luminophore, a luminophore emitting in the red wavelength region, a luminophore emitting in the blue-green wavelength region, a europium-doped luminophore emitting in the blue wavelength region and a Tb-doped luminophore emitting in the green wavelength region and a luminophore emitting in an emission range in the visible region with wavelengths of greater than 380 nm and emission bands in the near ultraviolet (UV-A). The near ultraviolet is taken to be the region with wavelengths in the range from 315 nm to 380 nm. The inventive provision of a luminophore with an emission range in the visible spectral region, that is, radiation with a wavelength in the range of 380 nm to 780 nm, which also has at least one emission band in the adjacent near ultraviolet (UV-A) region which includes radiation at wavelengths in the range of 380 nm to 315 nm and wherein the emitted intensity from the luminophore in the visible region is lower than in the UV-A region ensures the result that the radiation which can be generated with low pressure discharge lamps having the inventive luminophore composition is particularly well suited to color matching. The emitted intensity is taken to mean the radiation intensity distribution integrated over the wavelengths and the emitted intensity corresponds to the emitted radiative power and is measured in Watt. The radiation intensity distribution can be determined with a fluorescence spectrometer, for example, with a FluoroMax-2 from ISA-Spex Instruments (Edison, USA). For the measurement, the emitted radiation intensity distribution is determined with a 45°/90° geometry, wherein a powder sample pressed into tablet form, typically approximately 2-5 mm thick is introduced into the ray path of the spectrometer. The sample is irradiated with UV-C radiation with a wavelength of 254 nm. The angle between the incident radiation and the sample surface of the tablet is 45°. Using an emission monochromator integrated into the device, for example, a grating monochromator, the radiation intensity distribution emitted perpendicular to the surface of the tablet is determined with the aid of a photomultiplier. In order to determine the emitted intensity, said radiation intensity distribution is integrated over the relevant wavelength region. When the radiation intensity distribution of a low pressure discharge lamp or of a low pressure discharge lamp installed in a luminaire is measured, the radiation intensity distribution can be measured with a diode array spectrometer. The luminophore composition is excited with a mercury plasma, the emitted radiation is split up according to wavelength, and the dependence of the emitted radiative power (W) on wavelength (nm) is measured.

The luminophore composition according to various embodiments can generate radiation with a color temperature of greater than 4800 K and has a very good general color rendering index (CRI) of greater than 90 and, in particular, greater than 95, as can be determined according to the CIE 13-3-1995 standard color system. At a value of CRI=100, all color samples illuminated by the tested light source appear to have the same color as when illuminated by a reference light source.

Particularly preferably, the radiation that can be generated has a color temperature in the range of 4800 K to 5700 K and, more particularly preferably, approximately 5300 K.

Due to the emission in the UV-A spectral region, an improved assessment of fluorescence effects, such as are produced, for example, by sunlight, can also be made. Thus, the requirements defined by the ISO standard 3664 in the version dated Apr. 15, 2009 for color matching in reprographics can be met. ISO standard 3664 is an application standard with which the properties of a lamp in a luminaire are determined and evaluated. The color quality and the suitability of the color temperature is determined, inter alia, by comparison of the color rendering of metamer pairs and is given by the Metamerism Index. A metamerism index of 0 means that the metamer pairs have the same color when illuminated with the same light source, that is, the pair have the same color location x, y as when illuminated with a reference light source.

ISO standard 3664 requires a metamerism index in the visible region $M\_vis \leq 1.0$ and in the ultraviolet region $M\_uv \leq 1.5$. The smaller the metamerism index, the better is the reproduction of the natural properties. The metamerism index $M\_uv$ is a measure of the evaluation capability of fluorescence effects, as produced, for example, by sunlight in the spectral range from 300 nm to 400 nm. However, with previously known luminophore mixtures used in low pressure discharge lamps, it has only been possible to achieve a metamerism $M\_uv$ index in the region of 4.

According to various embodiments, the intensity emitted in the visible region by the luminophore having an emission range in the visible spectral region, which also includes at least one emission band in the adjacent near ultraviolet (UV-A) region, is between 2% and 20% of the intensity emitted by the luminophore in the near ultraviolet (UV-A). With this distribution, it is ensured that the luminophore composition has particularly good suitability for color matching with sufficiently good color rendering in the near ultraviolet region.

According to various embodiments, a luminophore having an emission range in the visible region containing wavelengths of greater than 380 nm and emission bands in the near ultraviolet (UV-A), also referred to as a luminophore emitting in the UV-A, including europium-doped strontium tetraborate, $SrB_4O_7$:Eu, can be provided. This has an emission maximum at 368 nm with a full width at half maximum (FWHM) of 40-50 nm, so that the emission occurs both in the visible and in the UV-A spectral regions.

On measurement of europium-doped strontium tetraborate, $SrB_4O_7$:Eu with a fluorescence spectrometer, specifically a FluoroMax-2 from ISA-Spex Instruments (Edison, USA), the following values of emitted intensity in Watt were measured, with a measuring accuracy of ±2%.

| Wavelength range [nm] | Emitted intensity [Watt] | Percentage proportion of overall intensity [%] |
|---|---|---|
| 315-780 | 1989.3 | 100.0 |
| 315-380 | 1724.4 | 86.7 |
| 380-780 | 264.9 | 13.3 |

It is apparent from this that this luminophore has an emission range in the visible region, with wavelengths of greater than 380 nm and at least one emission band in the near ultraviolet (UV-A) and that the emitted intensity of the luminophore in the visible region is smaller than in the UV-A region and, in particular, that the intensity of the luminophore emitted in the visible region is between 2% and 20% of the intensity emitted by the luminophore in the near ultraviolet (UV-A), specifically 15.4%.

Alternatively or additionally, europium-doped strontium magnesium phosphate $SrMgP_2O_7$:Eu and/or europium-doped strontium barium-aluminum silicate $(Sr,Ba)Al_2Si_2O_8$:Eu and/or europium-doped strontium phosphate $Sr_2(PO_4)$:Eu and/or calcium tungstate $CaWO_4$ may be provided as the luminophore emitting in the UV-A. Said luminophores emitting in the UV-A may thus be contained singly or in combination in the luminophore composition. Particularly, the use of Eu-doped luminophores emitting in the UV-A has proved to be advantageous.

In the luminophore composition according to various embodiments, the proportion by weight of luminophore emitting in the UV-A relative to the luminophore composition may be between 5% and 30%. A proportion by weight of between 10% and 15% of the total luminophore composition has proved to be particularly advantageous, since the desired requirements are particularly well fulfilled thereby.

According to further embodiments, the luminophore composition may include, as the halophosphate luminophore, Sb and Mn-doped $Ca_{10}(PO_4)_6(F,Cl)_2$:Sb,Mn. Particularly advantageously, the proportion by weight of the halophosphate luminophore and, in particular, the calcium halophosphate of the luminophore composition is between 20% and 26%.

According to a further preferred embodiment, a luminophore composition according to the invention may contain Ce and Mn-doped gadolinium zinc magnesium pentaborate $Gd(Zn,Mg)B_5O_{10}$:Ce,Mn as the luminophore emitting in the red wavelength region. By this means, the color rendering of the luminophore composition according to the invention may be further improved.

The proportion by weight of luminophore emitting in the red wavelength region relative to the luminophore composition may advantageously be between 30% and 36%.

According to various embodiments, the luminophore emitting in the blue-green wavelength region in the luminophore composition may be Eu-doped strontium aluminate $Sr_4Al_{14}O_{25}$:Eu.

Advantageously, the proportion by weight of luminophore emitting in the blue-green wavelength region relative to the luminophore composition may be between 20% and 26%.

According to a further advantageous embodiment, the luminophore composition may contain Tb-doped cerium magnesium aluminate $CeMgAl_{11}O_{19}$:Tb as the Tb-doped green emitting luminophore. However, other Tb-doped rare earth aluminates may also be used.

The proportion by weight of the Tb-doped green emitting luminophore relative to the luminophore composition may preferably be between 2% and 8%.

Further advantageously, Eu-doped barium magnesium aluminate $BaMgAl_{10}O_{17}$:Eu and/or Eu and Mn-doped barium magnesium aluminate $BaMg_2Al_{16}O_{27}$:Eu,Mn and/or Eu-doped strontium chlorophosphate $Sr_{10}(PO_4)Cl_2$:Eu and/or Eu-doped strontium calcium chlorophosphate $(Sr,Ca)_{10}(PO_4)Cl_2$:Eu may be provided as the europium-doped blue emitting luminophore. These luminophores may be contained in the luminophore composition individually or in any desired mixture.

It has proved to be particularly advantageous if the proportion by weight of the Eu-doped blue emitting luminophore relative to the luminophore composition is between 0% and 6%.

According to various embodiments, a luminophore emitting in the dark red wavelength region, in particular Mn-doped magnesium fluorogermanate $Mg_4FGeO_{5.5}$:Mn may be provided in the luminophore composition.

Advantageously, the proportion by weight of luminophore emitting in the dark red wavelength region relative to the luminophore composition may be between 0% and 5%.

Various embodiments relate to a low pressure discharge lamp including a discharge vessel and a luminophore coating on the inside of said vessel, the luminophore coating being a luminophore composition according to the invention.

In particular, the luminophore coating may only include the disclosed luminophore composition. The disclosed luminophore composition may be applied in the form of a single luminophore mixture, in particular in the form of a single layer, or in the form of a plurality of layers. Individual layers can contain different components of the disclosed luminophore composition. Particularly preferably, a layer facing the discharge chamber of the low pressure discharge lamp can contain all the components of the luminophore composition according to various embodiments.

A low pressure discharge lamp of this type may advantageously be used for color matching. In particular, the aforementioned requirements in accordance with the ISO standard 3664 for color matching in reprographics may be met by a low pressure discharge lamp of this type.

The daylight spectrum, which contains a UV component, may be reproduced particularly well with the low pressure discharge lamp according to the invention, the discharge vessel of which is transparent to radiation in the UV-A spectral region.

The luminophore composition is preferably applied in the form of a single luminophore mixture onto the inside of the discharge vessel and also consists of a single layer.

It may, however, also be advantageous to apply the luminophore composition in the form of two or more layers. For example, the lower layer facing the inside of the discharge vessel may consist of only the halophosphate luminophore, whereas a cover layer facing the discharge should then also contain the halophosphate luminophore and the other luminophores of the luminophore mixture.

In addition, a protective layer of $Al_2O_3$, $Y_2O_3$ or a rare earth oxide may be applied between the inside of the discharge vessel and the luminophore layer. By this means, diffusion of the mercury present in the discharge chamber into the discharge vessel and a resulting blackening of said vessel is effectively prevented.

The luminophore composition may advantageously be adapted to the transmission and reflection properties of the luminaire in which said luminophore is to be used. Of significance herein, for example, is whether and what type of plastics or glass is used as the covering, the material and the configuration of the reflector and other characteristics.

The luminophore composition may be used, in particular, with rod-shaped low pressure discharge lamps, for example, of the design type T8 L36W.

BRIEF DESCRIPTION OF THE DRAWINGS

In the drawings, like reference characters generally refer to the same parts throughout different views. The drawings are not necessarily to scale, emphasis instead being generally upon illustrating the principles of the invention. In the following description, various embodiments are described with reference to the following drawings, in which:

FIG. 2 shows measurement values compared with a known discharge lamp.

DETAILED DESCRIPTION

Figure 1:
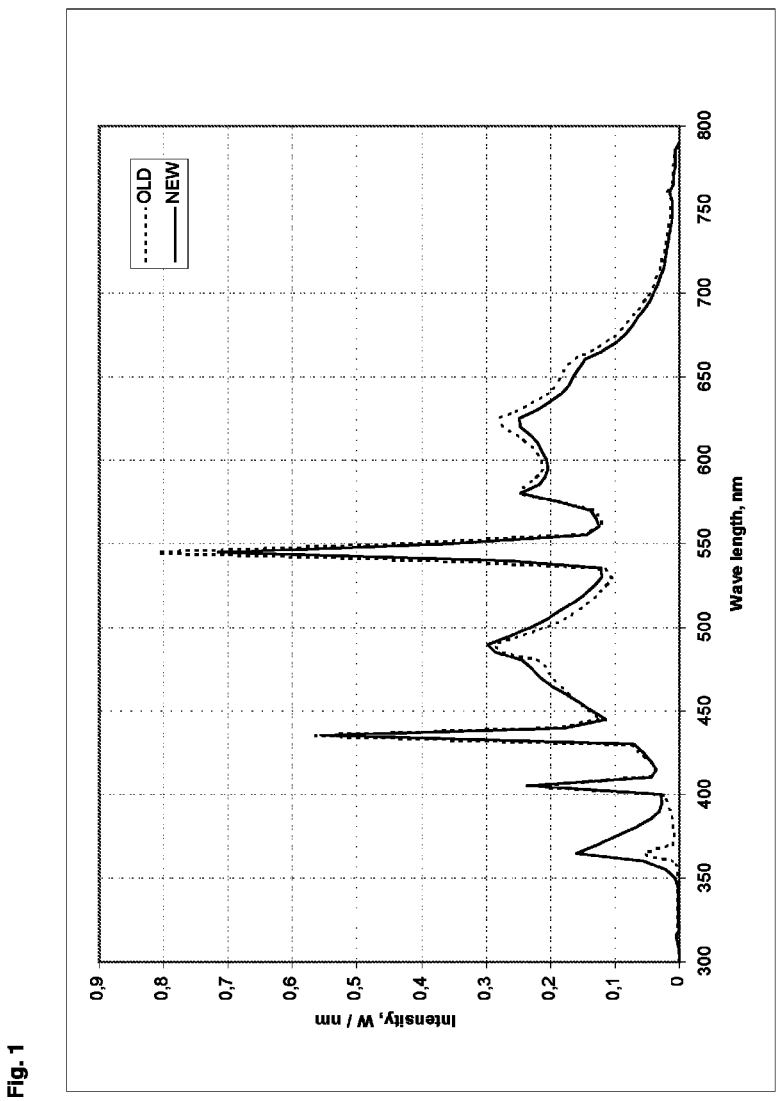
FIG. 1 shows a radiation intensity distribution according to an exemplary embodiment.

The following detailed description refers to the accompanying drawings that show, by way of illustration, specific details and embodiments in which the invention may be practiced.

Various embodiments will now be described in greater detail by reference to an exemplary embodiment. FIG. 1 shows the radiation intensity distribution and table 1, attached as FIG. 2, shows measurement values of said exemplary embodiment compared with a known low pressure discharge lamp. The known low pressure discharge lamp is an OSRAM LUMILUX COLOR proof T8, L36W/950, model year 2008.

The inner side of discharge vessels of rod-shaped mercury T8 low pressure discharge lamps having a length of approximately 120 cm, a krypton-argon gas filling and a nominal power rating of 36 W was coated with a luminophore composition according to the invention. This was applied in the form of a single layer.

The luminophore composition was made up as follows:

| | |
|---|---|
| $CeMgAl_{11}O_{19}$:Tb | 5.15% |
| $BaMgAl_{10}O_{17}$:Eu | 2.54% |
| $Ca_{10}(PO_4)_6(F,Cl)_2$:Sb, Mn, Cl | 22.95% |
| $SrB_4O_7$:Eu | 11.91% |
| $Sr_4Al_{14}O_{25}$:Eu | 23.48% |
| $Gd(Zn,Mg)B_5O_{10}$:Ce, Mn | 32.58% |
| $Mg_4FGeO_{5.5}$:Mn | 1.39% |

Using low pressure discharge lamps coated in this manner, the following test results were obtained. For measurements which require a luminaire, a luminaire from the firm of Waldmann was used for color matching. In this case, the direct light luminaire LE-ALEA 436 for four 36W T8 L36W lamps with the article number 682742000 was used. The test results for the known low pressure discharge lamp were obtained using the same luminaire.

The luminous flux, when measured in an Ulbricht sphere in accordance with IEC 60081 was 2300 lm, which essentially corresponds to the known low pressure discharge lamp.

On measurement in the Ulbricht sphere under standard IEC conditions, a chromaticity corresponding to the target chromaticity for a CIE 1931 color space observer of x/y=0.337/0.348 was achieved and the color rendering index CRI in accordance with CIE 13-3-1995 was at least 95. The metamerism index in the visible region in accordance with CIE 51.2-1999 was M_vis≤1.1 and that in the ultraviolet region was M_uv≤1.5.

The measurements in the Ulbricht sphere were made using the lamps and not with the luminaire.

Characterization in accordance with the ISO standard 3664:2009 resulted in the following values. The corresponding measurements were made with the lamp inserted into the luminaire.

The radiation intensity distribution achieved for an embodiment (NEW) is compared in FIG. 1 with that for the known low pressure discharge lamp (OLD) and the measured radiative power (W) achieved with a diode array spectrometer is shown in relation to the wavelength (nm). It is clearly apparent that the radiation intensity distribution of the embodiment according to the invention has substantial components in the UV-A. However, the small peak which is apparent in the UV-A for the known low pressure discharge lamp does not originate from the emissions of a luminophore, but rather represents unconverted mercury radiative transitions.

The measurement results achieved with the current embodiment (NEW) are shown in FIG. 1 in comparison with the results from the known low pressure discharge lamp (OLD).

The values were determined in the known luminaire in accordance with the stipulations of ISO 3664:2009 using a diode array spectrometer. u', v' denote the color tones in the CIE 1976 Uniform Chromaticity Scale Diagram (UCS) color space and delta u denotes the distance from the target color location u'=0.2102 and v'=0.4889, x10 and y10 are the color locations in the CIE color space for the 10° standard observer. M_vis and M_uv denote the averaged metamerism index for the comparison pairs for the D50 standard illumination type in accordance with CIE 51.2-1999. Ra8 denotes the general color rendering index CRI in accordance with CIE 13-3-1995. The special indices R1, R2, . . . , R14 are determined on the basis of this norm.

Based on these values, it is apparent that the current embodiment lies closer to the target location in the CIE 1976 UCS color space: delta u=0.0030 as compared with delta u=0.0068 for the known low pressure discharge lamp. The general color rendering index CRI for the current embodiment is also closer, at 97.1, to the ideal value of 100. The requirement of ISO standard 3664 that the metamerism index in the visible region M_vis≤1.0 and in the ultraviolet M_uv≤1.5 is fulfilled by the inventive embodiment at M_vis=0.7163 and M_uv=0.9778. The known low pressure discharge lamp, however, is clearly unable to fulfill the requirements at M_uv=3.3448.

It is therefore advantageously possible, with a luminophore composition according to various embodiments, to provide low pressure discharge lamps which have excellent color rendering properties wherein the spectral portions in the near ultraviolet are also reproduced well. This is evident therefrom that a metamerism index in the ultraviolet region M_uv≤1.5 is achievable. In particular, the requirements of ISO standard 3664:2009 can be met by such low pressure discharge lamps according to various embodiments.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A luminophore composition for low pressure discharge lamps for generating radiation with a color temperature of greater than 4800 K having a very good general color rendering index of greater than 90, the luminophore composition comprising at least one halophosphate luminophore, a luminophore emitting in the red wavelength region, a luminophore emitting in the blue-green wavelength region, a europium-doped luminophore emitting in the blue wavelength region and a Tb-doped luminophore emitting in the green wavelength region, wherein the luminophore composition comprises a luminophore emitting in an emission range in the visible region with wavelengths of greater than 380 nm and at least one emission band in the near ultraviolet and that the emitted intensity of the luminophore is smaller in the visible region than in the near ultraviolet region.

2. The luminophore composition as claimed in claim 1, wherein the intensity emitted in the visible region by the luminophore having an emission range in the visible spectral region, which also has at least one emission band in the near ultraviolet region, is between 2% and 20% of the intensity emitted by the luminophore in the near ultraviolet.

3. The luminophore composition as claimed in claim 1, wherein europium-doped strontium tetraborate, $SrB_4O_7$:Eu, and/or europium-doped strontium magnesium phosphate $SrMgP_2O_7$:Eu and/or europium-doped strontium barium-aluminum silicate $(Sr,Ba)Al_2Si_2O_5$:Eu and/or europium-doped strontium phosphate $Sr_3(PO_4)$:Eu and/or calcium tungstate $CaWO_4$ is provided as the luminophore emitting in the UV-A.

4. The luminophore composition as claimed in claim 1, wherein the proportion by weight of luminophore emitting in the UV-A region relative to the luminophore composition can be between 5% and 30% and, in particular, between 10% and 15%.

5. The luminophore composition as claimed in one of the claim 1, wherein Sb and Mn-doped calcium halophosphate $Ca_{10}(PO_4)_6(F,Cl)_2$:Sb,Mn,Cl is provided as the halophosphate luminophore.

6. The luminophore composition as claimed in one of the claim 1, wherein the proportion by weight of halophosphate luminophore relative to the luminophore composition is between 20% and 26%.

7. The luminophore composition as claimed in claim 1, wherein Ce and Mn-doped gadolinium zinc magnesium pentaborate $Gd(Zn,Mg)B_5O_{10}$:Ce,Mn is provided as the luminophore emitting in the red wavelength region.

8. The luminophore composition as claimed in claim 1, wherein the proportion by weight of luminophore emitting in the red wavelength region relative to the luminophore composition is between 30% and 36%.

9. The luminophore composition as claimed in claim 1, wherein Eu-doped strontium aluminate $Sr_4Al_{14}O_{25}$:Eu is provided as the luminophore emitting in the blue-green wavelength region.

10. The luminophore composition as claimed in claim 1, wherein the proportion by weight of luminophore emitting in the blue-green wavelength region relative to the luminophore composition is between 20% and 26%.

11. The luminophore composition as claimed in claim 1, wherein the luminophore composition contains Tb-doped cerium magnesium aluminate $CeMgAl_{11}O_{19}$:Tb as the Tb-doped luminophore emitting in the green wavelength region.

12. The luminophore composition as claimed in claim 1, wherein the proportion by weight of the Tb-doped luminophore emitting in the green wavelength region relative to the luminophore composition is between 2% and 8%.

13. The luminophore composition as claimed in claim 1, wherein Eu-doped barium magnesium aluminate $BaMgAl_{10}O_{17}$:Eu and/or Eu and Mn-doped barium magnesium aluminate $BaMg_2Al_{16}O_{27}$:Eu,Mn and/or Eu-doped strontium chlorophosphate $Sr_{10}(PO_4)Cl_2$:Eu and/or Eu-doped strontium calcium chlorophosphate $(Sr,Ca)_{10}(PO_4)Cl_2$:Eu is provided as the europium-doped luminophore emitting in the blue wavelength region.

14. The luminophore composition as claimed in claim 1, wherein the proportion by weight of the Eu-doped luminophore emitting in the blue wavelength region relative to the luminophore composition is between 0% and 6%.

15. The luminophore composition as claimed in claim 1, wherein a luminophore emitting in the dark red wavelength region, in particular Mn-doped magnesium fluorogermanate $Mg_4FGeO_{55}$:Mn is provided.

16. The luminophore composition as claimed in claim 15, wherein the proportion by weight of luminophore emitting in the dark red wavelength region relative to the luminophore composition is between 0% and 5%.

17. A low pressure discharge lamp comprising a discharge vessel and a luminophore composition applied to the inside thereof, wherein the luminophore coating comprises a luminophore composition as claimed in claim 1.

* * * * *

UNITED STATES PATENT AND TRADEMARK OFFICE
CERTIFICATE OF CORRECTION

PATENT NO. : 8,941,294 B2  
APPLICATION NO. : 13/504973  
DATED : January 27, 2015  
INVENTOR(S) : Goebel et al.

Page 1 of 1

It is certified that error appears in the above-identified patent and that said Letters Patent is hereby corrected as shown below:

In the claims:

Column 7, line 50: Replace subscripted 5 behind "O" by a subscripted 8.

Column 8, line 5: Delete "one of the".

Signed and Sealed this  
First Day of September, 2015

Michelle K. Lee  
*Director of the United States Patent and Trademark Office*